(12) United States Patent
Santos et al.

(10) Patent No.: US 8,122,251 B2
(45) Date of Patent: Feb. 21, 2012

(54) METHOD AND APPARATUS FOR PREVENTING PHISHING ATTACKS

(75) Inventors: Paulo A. Santos, Morganville, NJ (US); Maarten Wegdam, Borne (NL)

(73) Assignee: Alcatel Lucent, Paris (FR)

( * ) Notice: Subject to any disclaimer, the term of this patent is extended or adjusted under 35 U.S.C. 154(b) by 872 days.

(21) Appl. No.: 11/857,675

(22) Filed: Sep. 19, 2007

(65) Prior Publication Data

US 2009/0077637 A1 Mar. 19, 2009

(51) Int. Cl.
*H04L 9/00* (2006.01)

(52) U.S. Cl. ............ 713/169; 713/168; 713/170; 726/2; 726/3; 726/4; 726/5

(58) Field of Classification Search .................. None
See application file for complete search history.

(56) References Cited

U.S. PATENT DOCUMENTS

| | | | |
|---|---|---|---|
| 6,950,949 B1 * | 9/2005 | Gilchrist | 726/19 |
| 7,240,192 B1 * | 7/2007 | Paya et al. | 713/152 |
| 7,617,532 B1 * | 11/2009 | Alexander et al. | 726/22 |
| 2002/0029336 A1 * | 3/2002 | Sekiyama et al. | 713/169 |
| 2003/0217137 A1 * | 11/2003 | Roese et al. | 709/223 |
| 2005/0172229 A1 * | 8/2005 | Reno et al. | 715/700 |
| 2005/0268107 A1 * | 12/2005 | Harris et al. | 713/182 |
| 2006/0200855 A1 * | 9/2006 | Willis | 726/2 |
| 2007/0094727 A1 * | 4/2007 | Singh | 726/22 |
| 2007/0162961 A1 * | 7/2007 | Tarrance et al. | 726/5 |
| 2007/0240202 A1 * | 10/2007 | Sullivan et al. | 726/4 |

OTHER PUBLICATIONS

International Search Report and Written Opinion dated Mar. 11, 2009 in PCT/US2008/010573, Lucent Technologies Inc., Applicant, 14 pages.

Technical Trends in Phishing Attacks (Chapter 4)—http://www.us-cert.gov/reading_room/phishing_trends0511.pdf; Printed on Oct. 27, 2007; Reference date unknown.

Visa Security Progam: http://www.usa.visa.com/personal/security/visa_security_program/vbv/faq.html?it=12|/personal/security/visa_security_program/vbv/shop%2Ehtml|FAQ; Printed on Oct. 27, 2007; Reference date unknown.

Office Action dated Apr. 20, 2011 in Korean Patent Application No. 2010-7006161, Alcatel-Lucent USA Inc., Applicant, 3 pages.

* cited by examiner

*Primary Examiner* — Ponnoreay Pich
(74) *Attorney, Agent, or Firm* — Wall & Tong, LLP

(57) ABSTRACT

The invention includes a method and apparatus for preventing phishing attacks. A first method, for informing a user that a remote server is valid, includes receiving a request for information available from the remote server where the request includes an identifier, obtaining a dynamic personal attribute associated with the user using the identifier, and propagating the dynamic personal attribute toward the user, wherein the dynamic personal attribute is adapted for use by the user in validating the remote server. The remote server may be a web server, an authentication server, or any other remote device with which the user may desire to authenticate. A second method, for informing a user that a received message is associated with a valid website, includes obtaining a dynamic personal attribute associated with a user, generating a message for the user where the message is adapted to enable the user to request a website and includes the dynamic personal attribute associated with the user, and propagating the message toward the user. The received message may be any type of message, such as an email message, an instant message, a text message, and the like.

15 Claims, 12 Drawing Sheets

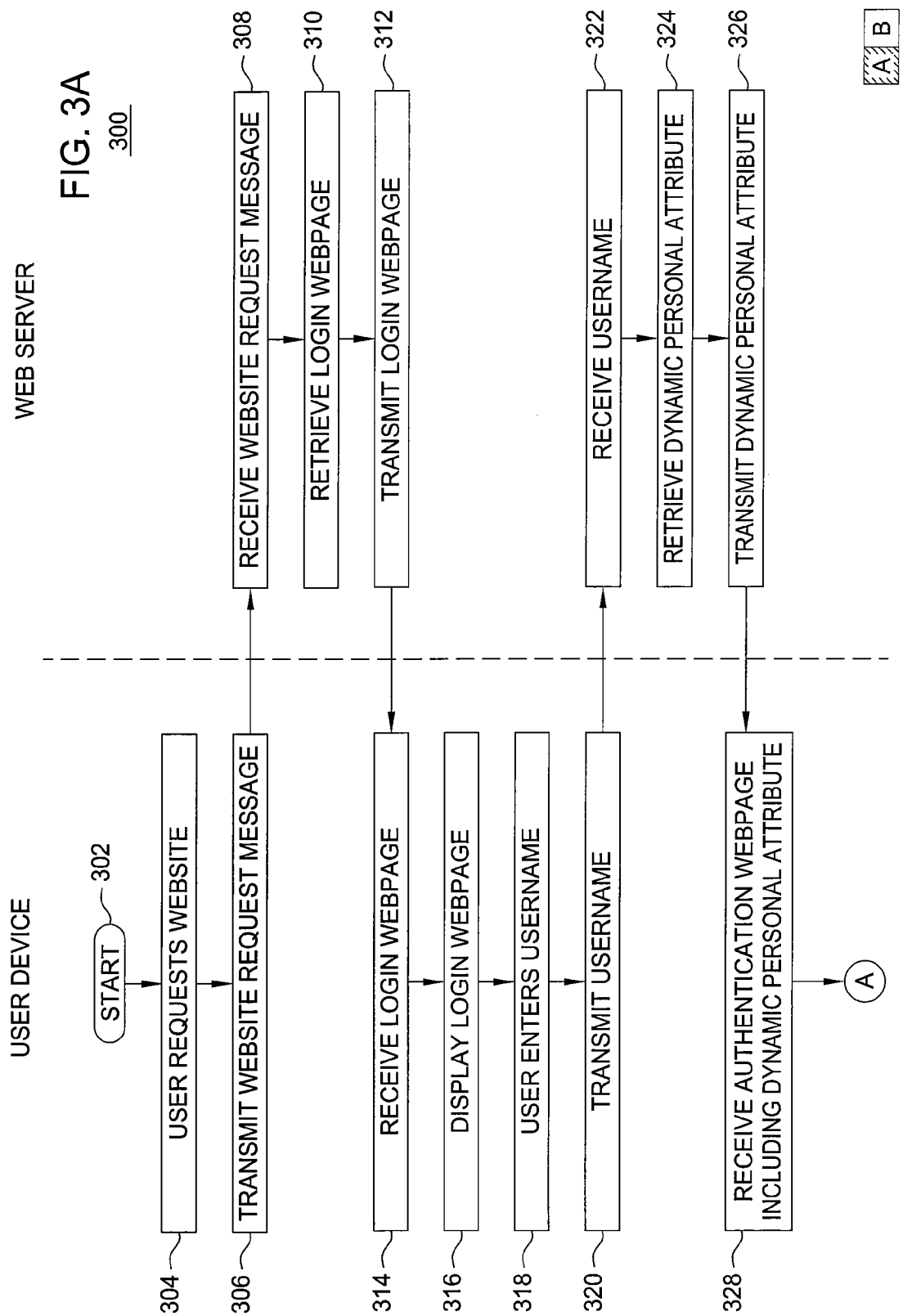

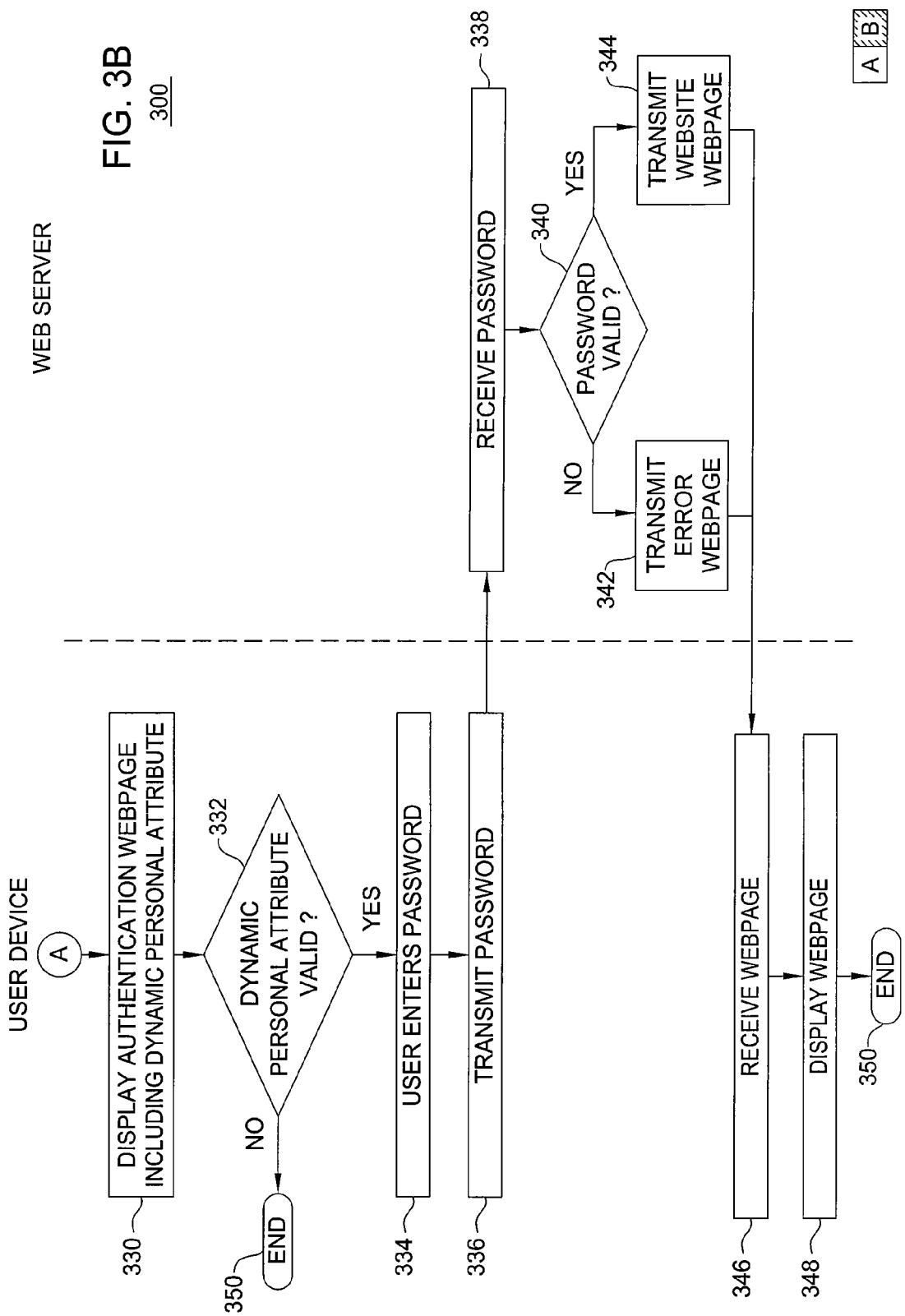

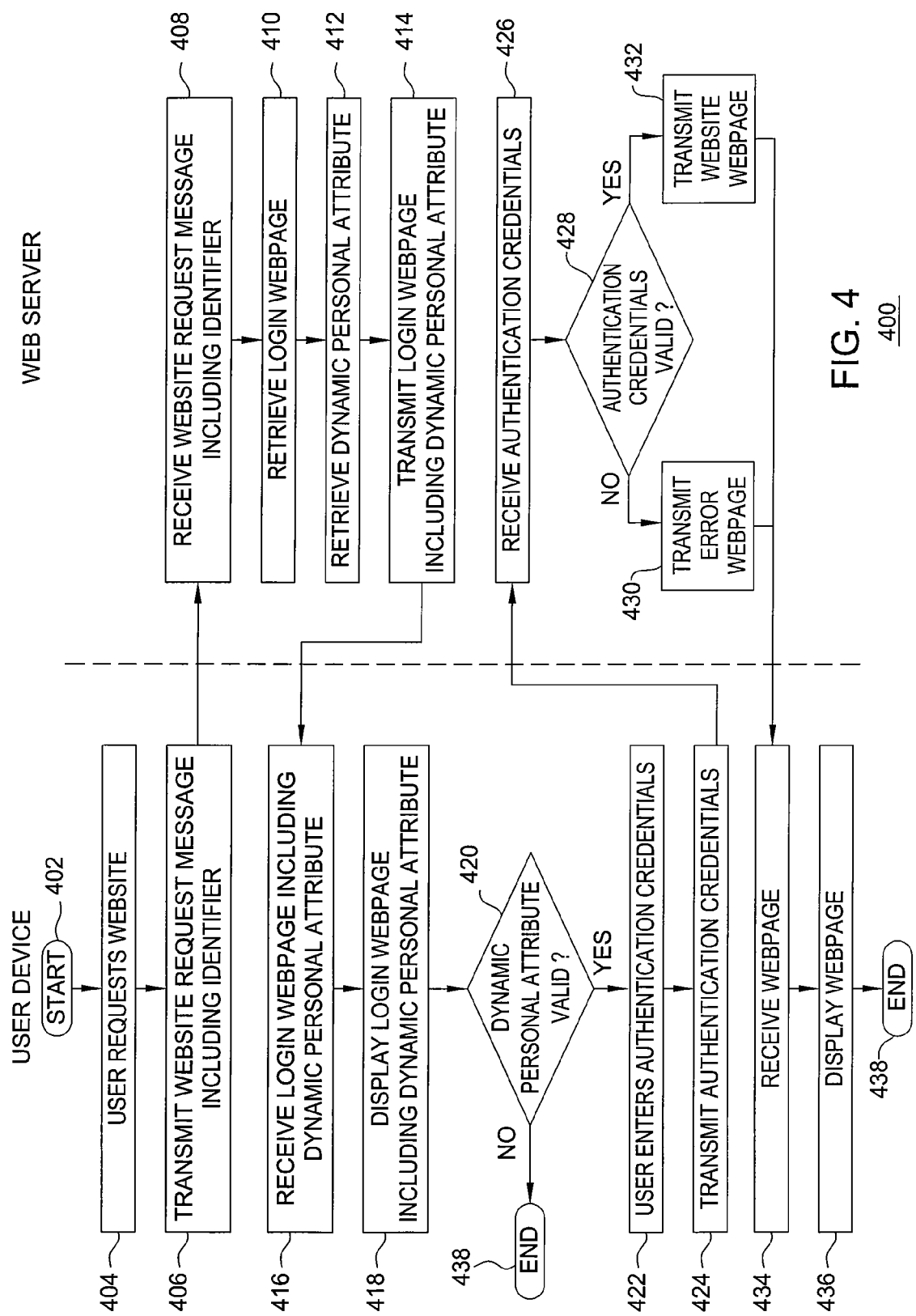

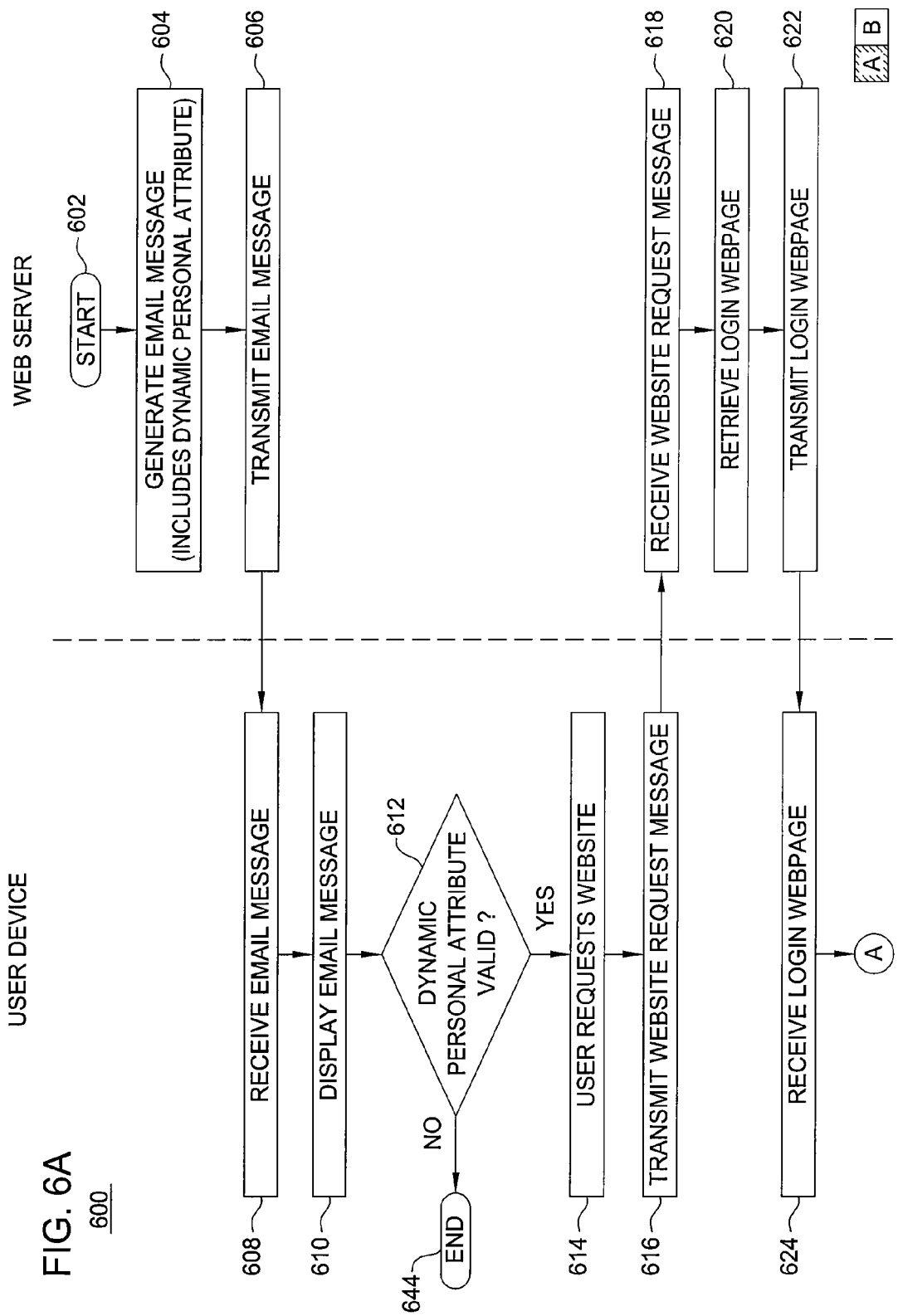

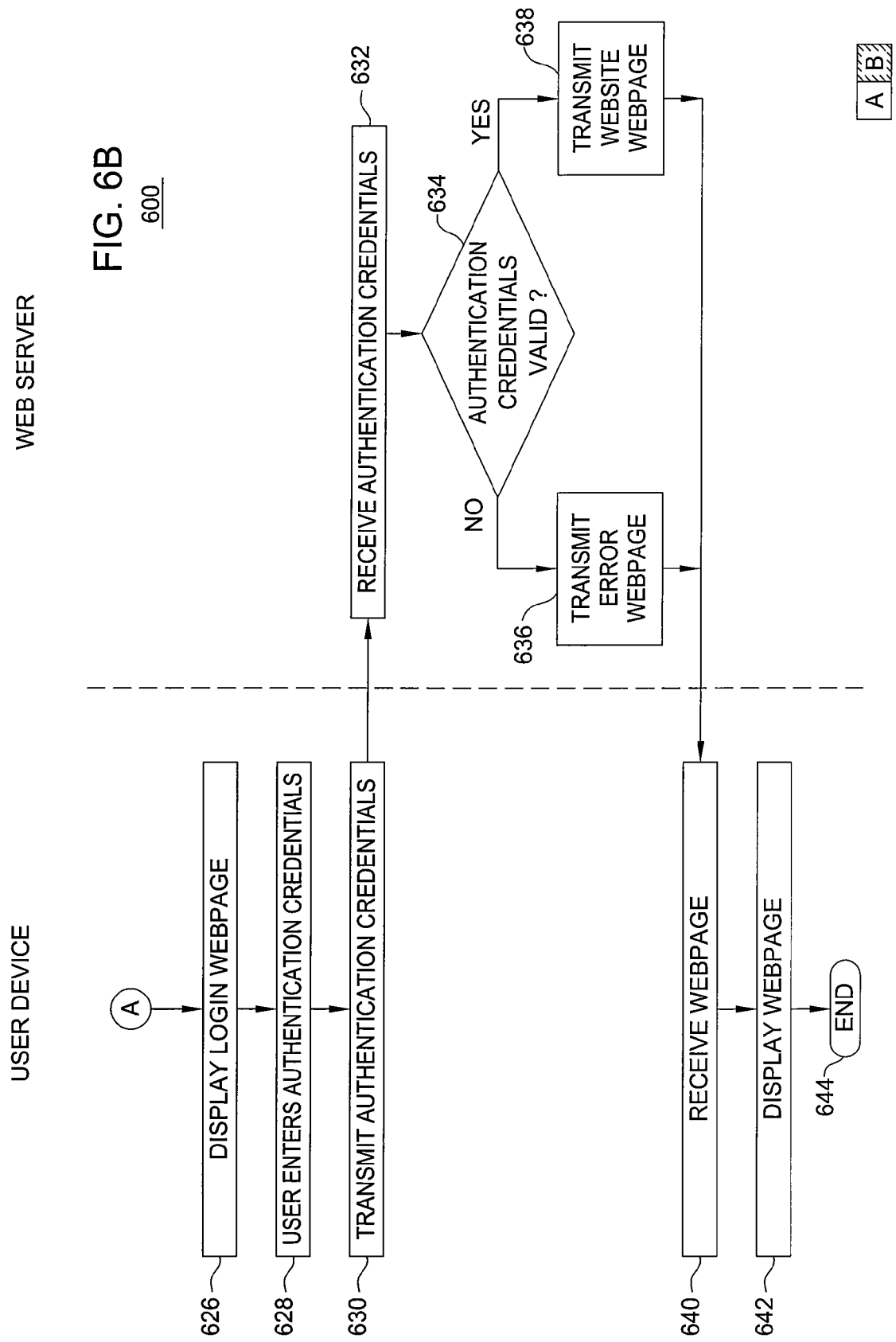

METHOD AND APPARATUS FOR PREVENTING PHISHING ATTACKS

FIELD OF THE INVENTION

The invention relates to the field of communication networks and, more specifically, to preventing phishing attacks.

BACKGROUND OF THE INVENTION

As Internet usage increases, Internet-based crime is blooming. One prevalent crime is "phishing", which is an attempt to trick an Internet user into providing personal information to the phishing attacker. The information typically sought by phishing attackers is Internet user login information (e.g., the login name and password for an Internet user) and, sometimes, other information such as credit card information, birth date, birth place, and the like. The phishing attackers use the obtained Internet user information in order to steal the identity of the Internet user. For example, a phishing attack may be used in order to obtain information to impersonate the Internet user (e.g., to log into e-mail accounts, to authorize credit card transactions, and to perform similar actions in the name of the Internet user).

Phishing attackers may use various different schemes to launch phishing attacks. A phishing attacker may use Domain Name Service (DNS) spoofing to direct users to a website owned by the attacker when users enter a Uniform Resource Locator (URL) of a real website. The spoofed website owned by the attacker is often a good look-alike; not exactly the same as the real website, but sufficiently convincing to not alert the user. Sometimes, the spoofed website may even connect to the real website in the back-end, acting as a pass-through to the real website. Furthermore, phishing attackers may register a domain name that closely resembles a well-known domain name (e.g., registering www.googel.com instead of www.google.com to attack users that mistype the real domain name).

In such schemes, where phishing attackers use DNS spoofing, the phishing attackers may wait until users enter the URL in an attempt to access the legitimate website or, alternatively, the phishing attackers may launch the attack by sending emails or instant messages to users that contain links to the spoofed website that is imitating the legitimate website. Where the phishing attacker launches the attack, the emails or instant messages appear to originate from the legitimate server of the legitimate website (e.g., by faking email addresses and using text and images similar to the those commonly used by the legitimate websites). Unfortunately, users are often duped into clicking on the links included in the phishing emails and instant messages.

Many attempts have been made to prevent phishing attacks. For example, attempts to prevent phishing attacks include using dedicated hardware solutions, one-time passwords, server-side certificates, graphical indications of security level (e.g., displaying an icon representing a padlock if the website displayed in the Internet browser is secure), client-side browser extensions (e.g., to check for typical signs of phishing, such as checking website URLs and checking the syntax of presented website pages), blacklists (e.g., maintaining lists of phishing webpages locally on a client or remotely on a server). Furthermore, static information is sometimes displayed to the user during login for use by the user in determining whether the website is legitimate.

Disadvantageously, despite these attempts to prevent phishing attacks, users are still easily tricked by phishing attacks. For example, users often fail to check the validity of a website and, further, when they do check the users typically cannot tell the difference between a valid certificate and an invalid certificate. Furthermore, as phishing attempts proliferate and users become more educated about them, users are becoming more skeptical of clicking on links in emails and instant messages purporting to be from legitimate senders. While this reduces the success of phishing attacks, it also significantly impacts the ability of legitimate providers to contact their own users for legitimate reasons. Therefore, there is clearly a need for an improved technique for preventing phishing attacks.

SUMMARY OF THE INVENTION

Various deficiencies in the prior art are addressed through the invention of a method and apparatus for preventing phishing attacks.

A first method, for informing a user that a remote server is valid, includes receiving a request for information available from the remote server where the request includes an identifier, obtaining a dynamic personal attribute associated with the user using the identifier, and propagating the dynamic personal attribute toward the user, wherein the dynamic personal attribute is adapted for use by the user in validating the remote server. The remote server may be a web server, an authentication server, or any other remote device with which the user may desire to authenticate.

A second method, for informing a user that a received message is associated with a valid website, includes obtaining a dynamic personal attribute associated with a user, generating a message for the user where the message is adapted to enable the user to request a website and includes the dynamic personal attribute associated with the user, and propagating the message toward the user. The received message may be any type of message, such as an email message, an instant message, a text message, and the like.

BRIEF DESCRIPTION OF THE DRAWINGS

The teachings of the present invention can be readily understood by considering the following detailed description in conjunction with the accompanying drawings, in which:

FIG. 3 depicts a method according to one embodiment of the present invention;

FIG. 4 depicts a method according to one embodiment of the present invention;

FIG. 6 depicts a method according to one embodiment of the present invention;

DETAILED DESCRIPTION OF THE INVENTION

The present invention enables a user to review a dynamic personal attribute before authenticating with a remote server. The dynamic personal attribute of the user may be provided to the user during the authentication process (e.g. in response to a request from the user via a user terminal) or before the login process (e.g., in an out-of-band communication, such as an email, instant message, and the like). Since the dynamic personal attribute is provided to the user before the user enters sensitive authentication credentials, the dynamic personal attribute may be used to distinguish valid servers from invalid servers (i.e., because the servers would not know the dynamic personal attribute) before the user enters any sensitive information.

The personal nature of the dynamic personal attribute and the dynamic nature of the dynamic personal attribute provide a higher level of security for users than existing user authentication schemes in which static values are used for server validation during user authentication. This is at least partly because both the personal and dynamic nature of the dynamic personal attribute make it more difficult for a phishing attacker to obtain the dynamic personal attribute and, furthermore, even if the phishing attacker does somehow obtain the dynamic personal attribute, the dynamic nature of the dynamic personal attribute ensures that the dynamic personal attribute will be quickly outdated.

The present invention is primarily depicted and described herein within the context of user authentication with a web server (e.g., for enabling the user to login to a website); however, as described herein, those skilled in the art will appreciate the present invention is not limited to user authentication with a web server. The present invention may be utilized to provide secure user authentication for various other user authentication applications, such as user authentication for financial transactions (e.g., ATM machines, debit card and credit card transactions, and the like), user authentication for network access, and the like.

Figure 1:
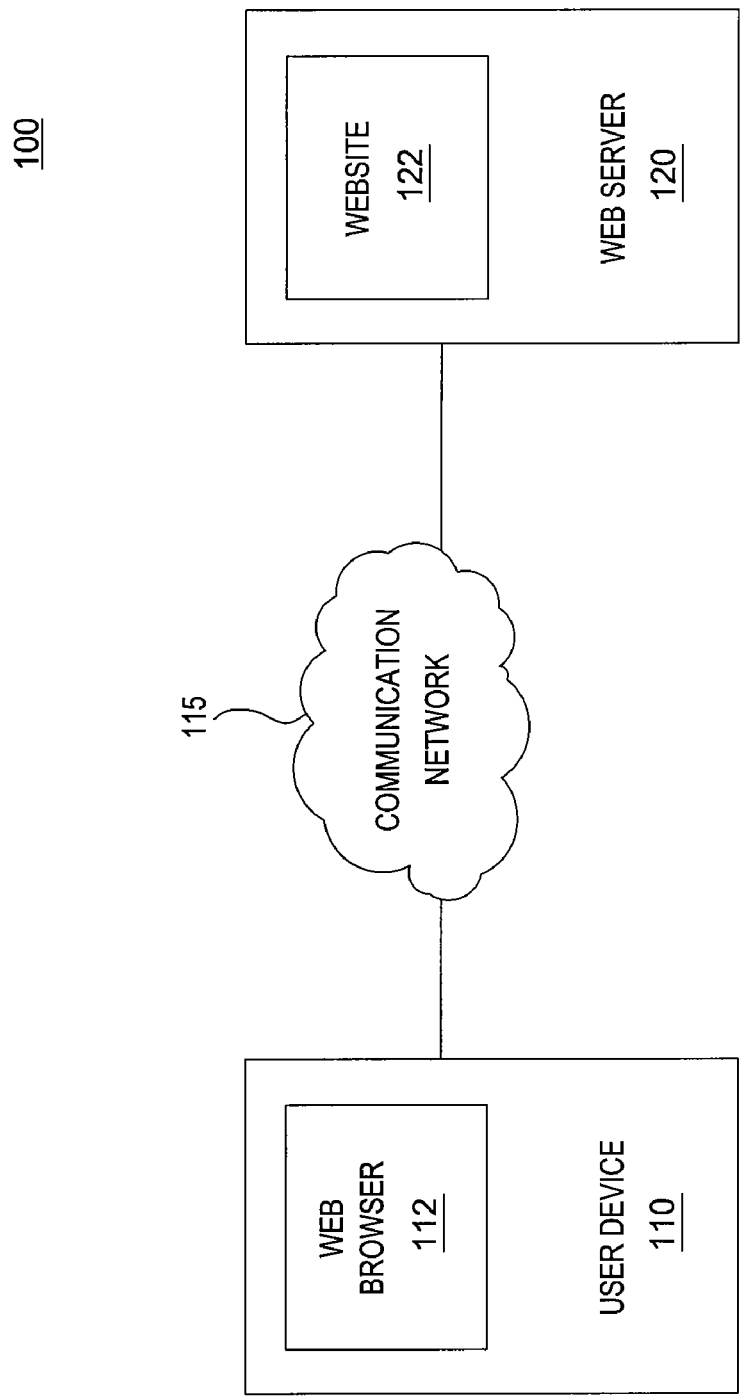
FIG. 1 depicts a high-level block diagram of a communication system according to one embodiment of the present invention.

FIG. 1 depicts a high-level block diagram of a communication system according to one embodiment of the present invention. Specifically, communication system 100 of FIG. 1 includes a user device 110 and a web server 120 in communication via a communication network 115. As depicted in FIG. 1, user device 110 includes a web browser 112 and web server 120 hosts a website 122. A user associated with user device 110 uses web browser 112 to interact with website 122 hosted by web server 120. The communication network 115 may be any type of communication network adapted for facilitating communications between user device 110 and web server 120 (e.g., a wireline network and/or a wireless network).

The user device 110 includes any device adapted for enabling a user to interact with network-based content. For example, user device 110 may include a desktop computer, a laptop computer, a mobile phone, a personal data assistant, and the like, as well as various combinations thereof. The web browser 112 includes any browser adapted for requesting and displaying web pages. For example, web browser 112 may include at least one of Microsoft INTERNET EXPLORER, Mozilla FIREFOX, and the like, as well as various combinations thereof. The operation of user device 110 and web browser 112 in performing various functions of the present invention may be better understood with respect to FIG. 2 and FIG. 4.

The web server 120 includes any device adapted for hosting a website, including processing requests for webpages of the website. The web server 120 is adapted for storing a dynamic personal attribute for each user registered with website 122. The web server 120 is adapted for providing a dynamic personal attribute to a user of user device 110 (or causing a dynamic personal attribute to be provided to a user of user device 110) in order to enable the user of user device 110 to distinguish website 122 from a spoofed version of website 122 (i.e., in order to prevent a phishing attack). The operation of web server 120 in performing various functions of the present invention may be better understood with respect to FIG. 3, FIG. 4, and FIG. 6.

Although omitted for purposes of clarity, those skilled in the art will appreciate that, in addition to web browser 112, user device 110 includes various other components (e.g., processors, memory, network interface modules, input/output modules, and the like, as well as various combinations thereof, e.g., as depicted and described in FIG. 4). Similarly, although omitted for purposes of clarity, those skilled in the art will appreciate that, in addition to website 122, web server 120 includes various other components (e.g., processors, memory, network interface modules, and the like, as well as various combinations thereof, e.g., as depicted and described in FIG. 4) adapted for hosting website 122, and, optionally other websites (omitted for purposes of clarity).

The present invention uses a dynamic personal attribute associated with a user for a particular website in order to enable the user to distinguish the website from invalid versions of the website (i.e., which may be malicious web servers hosting spoofed versions of the website used for phishing attacks). The valid website ensures that the dynamic personal attribute is provided to the user in order to enable the user to distinguish the valid website from invalid versions of the website. In one embodiment, the dynamic personal attribute may be provided to the user during the authentication process (e.g., after the user enters a username but before the user enters a password or any other sensitive information). In one embodiment, the dynamic personal attribute may be provided to the user before the authentication process (e.g., in an out-of-band message such as an email message, instant message, and the like).

The dynamic personal attribute is information that is: (1) personal to the user and (2) adapted for being updated dynamically due to the nature of the information used as the dynamic personal attribute (i.e., without requiring the user to actively update the dynamic personal attribute). The dynamic personal attribute is adapted for being updated automatically on a regular basis (e.g., at least once per day, at least once per month, and the like). The frequency with which the dynamic personal attribute is updated may depend on one or more factors, such as the frequency with which the user accesses the website (or is expected to access the website), the type of information used as the dynamic personal attribute, and the like, as well as various combinations thereof.

For example, a dynamic personal attribute may be information such as the current location of the user's cell phone, the location of the user's cell phone at a certain time in the near past, the location of the user's cell phone during the last call, the most recent incoming call received by the user, the most recent outgoing call placed by the user, the sender of the most recent incoming text message received by the user, the receiver of the most recent outgoing text message sent by the user, the current status message in an instant message (IM) client associated with the user, and the like, as well as various combinations thereof.

For example, a dynamic personal attribute may be information such as the date the most recent payment was made by the user (e.g., for an account associated with the website for which the information is being used as the dynamic personal attribute), the amount of the most recent payment made by the user (e.g., for an account associated with the website for which the information is being used as the dynamic personal attribute), the location of the most recent ATM withdrawal made by the user, the amount of the most recent ATM withdrawal made by the user, the location of the most recent purchase made by the user with a credit card, the amount of the most recent purchase made by the user with a credit card, and the like, as well as various combinations thereof.

From these examples, it is clear that the dynamic personal attribute is updated automatically (e.g., as the user goes about the activities of his or her life). Thus, the dynamic personal attribute of the present invention is updated regularly and, further, the dynamic personal attribute is information that is either capable of being instantly known by the user (e.g., where the information is the current location of the wireless device of the user or other presence information) or is at least information that is fresh in the mind of the user (e.g., the location of the last ATM withdrawal, the amount of the last payment made, and the like). This advantageously obviates any need for the user to consciously remember the dynamic personal attribute (along with all of the other usernames and passwords the user may already be responsible for) and, further, obviates any need for the user to consciously remember to update the dynamic personal attribute.

From these examples, it is further clear that the frequency with which the dynamic personal attribute is updated may depend on the type of information used as the dynamic personal attribute. For example, where the dynamic personal attribute is the current location of the cell phone of the user, the dynamic personal attribute may be updated many times each day, once each day, and the like. For example, where the dynamic personal attribute is the amount or location of the most recent ATM withdrawal, the dynamic personal attribute may be updated weekly, monthly, and the like. For example, where the dynamic personal attribute is the amount of the most recent payment made by the user (e.g., most recent payment of a credit card, most recent payment of wireless bill, and the like), the dynamic personal attribute may be updated once every other week, monthly, and the like.

Although primarily depicted and described with respect to using specific information (e.g., information related to communications by the user or information related to financial transactions by the user) as the dynamic personal attribute for a user, the dynamic personal attribute may be any information that is personal and dynamic.

Although primarily described with respect to providing the most recent information as the dynamic personal attribute (e.g., the location of the most recent ATM withdrawal, the amount of the most recent ATM withdrawal, and the like), the dynamic personal attribute does not necessarily have to be the most recent information associated with a user.

In one embodiment, for example, the dynamic personal attribute may be the next-to-most-recent information. For example, the next-to-most recent information may be the amount of the next-to-most-recent payment (e.g., the amount paid by the user for the bill the previous month), the location of the next-to-most recent ATM withdrawal, the next-to-most-recent incoming call received by the user, the next-to-most-recent outgoing call placed by the user, and the like, as well as various combinations thereof.

In one embodiment, for example, the dynamic personal attribute may include timing information such that the user can match the dynamic personal attribute to the timing information. For example, the dynamic personal attribute may include a location of an ATM withdrawal and a date on which the ATM withdrawal took place so that the user can validate that the indicated ATM withdrawal did in fact occur at the indicated location on the indicated date.

In one embodiment, in order to protect sensitive personal data from being compromised, only a portion of the information of the dynamic personal attribute may be provided as the dynamic personal attribute. For example, instead of providing the full telephone number of the last incoming call received by the user, only a portion of the telephone number (e.g., the last four digits) of the last incoming call received by the user may be provided as the dynamic personal attribute. For example, instead of providing the full amount of the last payment made by the user, only a portion of the amount of the last payment (e.g., the cents) made by the user may be provided as the dynamic personal attribute. Similar types of information protection schemes may be employed for other types of information which may be provided as the dynamic personal attribute.

The dynamic personal attribute may be associated with one user, a group of users, an account, and the like, as well as various combinations thereof. The dynamic personal attribute may be associated with a single website or multiple websites. Thus, depending on the types of websites and the source(s) of the dynamic personal attribute, the present invention may be used in various different ways to protect individual users or groups of users, for individual websites or groups of websites, from phishing attacks which may be directed at the users and/or websites.

The dynamic personal attribute may be stored in any manner, which may depend on the type of information used as the dynamic personal attribute, the source of the information used as the dynamic personal attribute, and like factors. Similarly, the dynamic personal attribute may be retrieved in any manner, which may depend on the manner in which the dynamic personal attribute is stored, as well as other factors, which may or may not include factors associated with the manner in which the dynamic personal attribute is stored.

In one embodiment, for example, the dynamic personal attribute may be stored and retrieved based on some information associated with the user with which the dynamic personal attribute is associated. For example, the dynamic personal attribute may be stored and retrieved such that the dynamic personal attribute is associated with a username of the user (and/or some other information associated with the user, such as a user identifier, a user device identifier, and the like, as well as various combinations thereof).

In this manner, the dynamic personal attribute may be provided to the user based on some non-sensitive information associated with the user, thereby enabling the dynamic personal attribute to be provided to the user for validation before the user is required to enter any sensitive information (e.g., before the user is required to enter his or her password to access the website or is required to enter any other sensitive information associated with the user).

The dynamic personal attribute provides numerous advantages over existing website validation schemes. The dynamic personal attribute is much more intuitive for users than certificate-based website validation schemes and, thus, is much easier for users to understand and use in a manner for preventing phishing attacks. The dynamic and personal nature of the dynamic personal attribute provides a higher level of security for users than existing website validation schemes in which static values are used for website validation because: (1) both the personal nature and the dynamic nature of the dynamic personal attribute each make it more difficult for a malicious entity to obtain or guess the dynamic personal attribute; and (2) if the dynamic personal attribute is somehow obtained or guessed by a malicious entity, the dynamic personal attribute is quickly, automatically outdated.

The dynamic personal attribute provides at least one additional layer of security with respect to the ability of a malicious entity to obtain and utilize sensitive information. An invalid web server may not know that an attribute should be provided to the user, may know that an attribute should be provided to the user but may not know that the attribute should be a personal attribute, may know that a personal attribute should be provided to the user but may not know the type of personal information that should be provided to the user, may know what type of personal information should be provided to the user but may not know an exact value of the personal information that should be provided to the user, or may know an exact value of the personal information that should be provided to the user (e.g., information that was somehow captured by the invalid web server) but, due to the dynamic nature of the personal attribute, may not know the most recent value of the personal information that should be provided to the user).

As such, as described herein, both the personal nature of the dynamic personal attribute and the dynamic nature of the dynamic personal attribute provide significant additional security capable of preventing the user from falling victim to a phishing attack. These benefits, as well as other benefits, of the dynamic personal attribute of the present invention may be better understood with respect to FIG. 2-FIG. 9.

Figure 2:
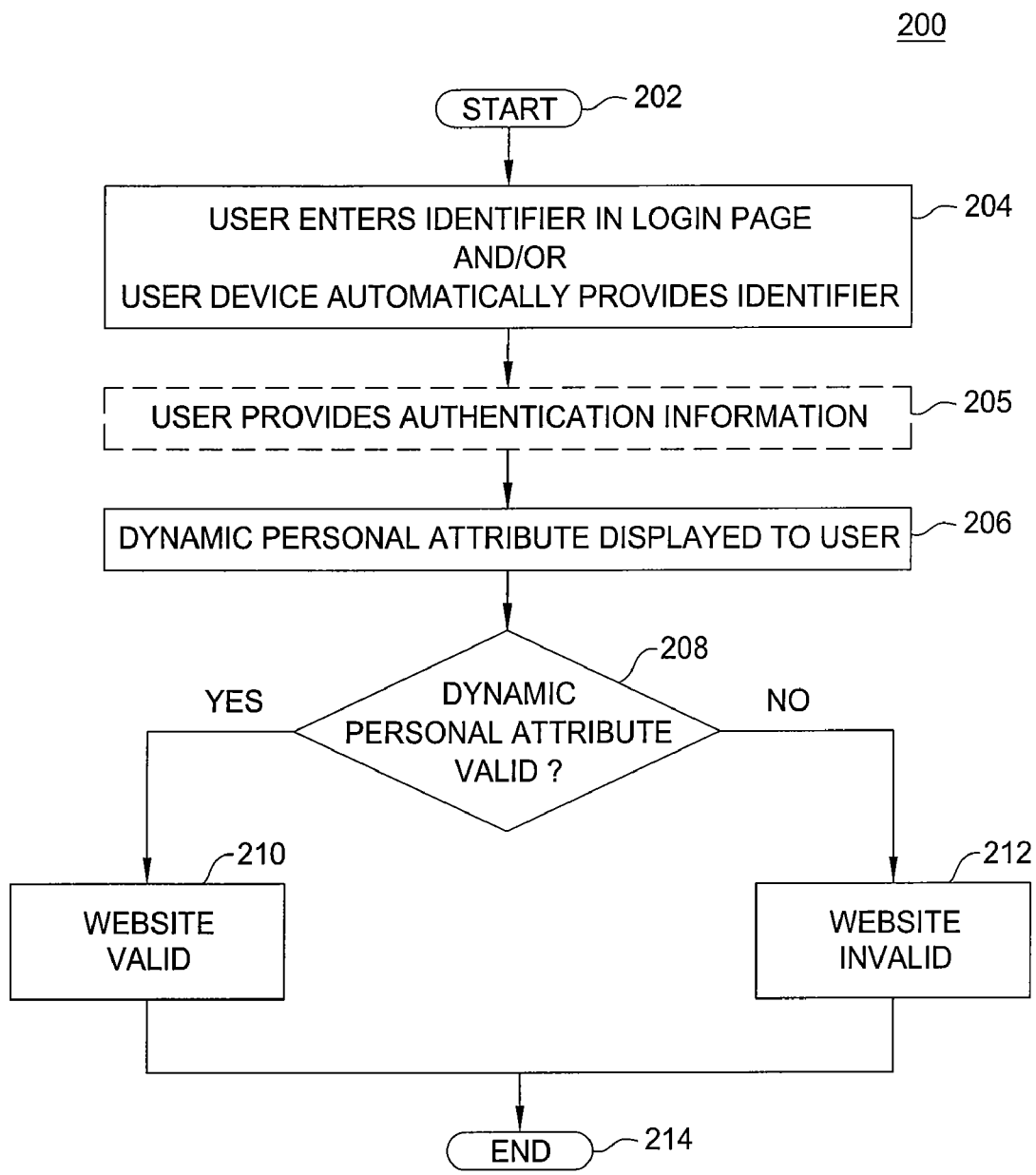
FIG. 2 depicts a method according to one embodiment of the present invention.

FIG. 2 depicts a method according to one embodiment of the present invention. Specifically, method 200 of FIG. 2 includes a method for using a dynamic personal attribute associated with a user for preventing a phishing attack against that user. The method 200 of FIG. 2 is primarily described from the perspective of the user because the user does not know whether the website is a valid website or an invalid website. Although depicted and described as being performed serially, at least a portion of the steps of method 200 of FIG. 2 may be performed contemporaneously, or in a different order than depicted and described with respect to FIG. 2. The method 200 begins at step 202 and proceeds to step 204.

At step 204, an identifier (or identifiers) is provided. The identifier(s) may be provided manually by the user and/or automatically by the user device of the user.

In one embodiment, the user enters an identifier in a login page for use by the web server and retrieving and providing the dynamic personal attribute. In one such embodiment, the identifier may be a username of the user. In another such embodiment, the identifier may be an identifier other than a username of the user (i.e., in order to enable the user to verify the validity of the website before providing a username).

In one embodiment, the user device automatically provides an identifier for use by the web server and retrieving and providing the dynamic personal attribute. The identifier may include one or more of a MAC address of the user device, one or more cookies, and the like, as well as various combinations thereof.

At step 205 (an optional step), the user may be requested to provide authentication information before a dynamic personal attribute is displayed to the user (or the user may be requested to review and validate authentication information provided to the user before a dynamic personal attribute is displayed to the user).

The authentication information may include any information which may be used as a security measure before the dynamic personal attribute is displayed to the user. For example, the authentication information may include device authentication information (e.g., MAC address), one or more cookies, one or more additional passwords, user profile information (e.g., Mother's maiden name, date of birth, and the like), and the like, as well as various combinations thereof.

At step 206, a dynamic personal attribute is displayed to the user. The dynamic personal attribute is displayed to the user based on the identifier(s) provided by the user and/or user device. In one embodiment (in which step 206 proceeds from step 204), the dynamic personal attribute is displayed as long as the identifier(s) is validated. In one embodiment, in which step 208 proceeds from step 205), the dynamic personal attribute is displayed as long as the identifier(s) is validated, and, further, the additional authentication information is deemed to be valid.

At step 208, a determination is made as to whether the dynamic personal attribute is valid. The determination as to whether the dynamic personal attribute is valid may be made by the user and/or the user device.

If the dynamic personal attribute is valid, method 200 proceeds to step 210, at which point the user deems the website to be a valid website (i.e., the true version of the website that the user is attempting to access) and, thus the user does continue the authentication process. If the user previously entered a username for the website, the user now enters a password for the website. If the user previously entered an identifier other than the username, the user enters the username and password for the website.

If the dynamic personal attribute is invalid, method 200 proceeds to step 212, at which point the user deems the website to be an invalid website (e.g., a spoofed version of the real website that is phishing for user information) and, thus, the user does not continue the authentication process (i.e., the user does not enter the username or password; or, where the user previously entered the username the user does not enter the password for the website).

From steps 210 and 212, method 200 proceeds to step 214. At step 214, method 200 ends; however, although the authentication process using the dynamic personal attribute ends, the user has been authenticated (i.e., assuming that the password entered by the user is valid) and, thus, may continue to interact with the various webpages of the website. Although omitted for purposes of clarity, those skilled in the art will appreciate that the functions of method 200 of FIG. 2 are enabled by a series of interactions between the user device used by the user to access the website and the web server hosting the website accessed by the user. A method for using a dynamic personal attribute associated with a user for preventing a phishing attack against that user (including messaging between the user device and the web server) is depicted and described with respect to FIG. 3.

FIG. 3 depicts a method according to one embodiment of the present invention. Specifically, method 300 of FIG. 3 includes a method for using a dynamic personal attribute associated with a user for preventing a phishing attack against that user. The method 300 of FIG. 3 is primarily described from the perspective of the interactions between the user device and the web server in order to describe the functions of the web server in providing the dynamic personal attribute which enables the user to identify the website as a valid website. Although depicted and described as being performed serially, at least a portion of the steps of method 300 of FIG. 3 may be performed contemporaneously, or in a different order than depicted and described with respect to FIG. 3. The method 300 begins at step 302 and proceeds to step 304.

At step 304, a user requests a website using a user device. The user may request the web page by typing the domain name of the website in an address bar of a web browser. The user may request the web page by clicking a hyperlink (e.g., from another website, from an e-mail, and the like). The user may request the web page in any other manner for requesting a web page.

At step 306, the user device transmits a website request message to a web server (i.e., the web server hosting the website requested by the user). At step 308, the web server receives the website request message from the user device. At step 310, the web server retrieves a login webpage of the requested website. At step 312, the web server transmits the login webpage to the user device. The login webpage is adapted to accept a USERNAME value from the user via a web browser of the user device.

At step 314, the user device receives the login webpage from the web server. At step 316, the user device displays the login webpage using the web browser. At step 318, the user enters a username for the website in the login webpage. At step 320, the user device transmits the username for the website to the web server. For example, the user may enter the username in a USERNAME field of the login page and trigger communication of the username to the web server (e.g., by pressing ENTER, clicking some button or link in the login webpage, and the like).

At step 322, the web server receives the username from the user device. At step 324, the web server retrieves a dynamic personal attribute for the user. The web server retrieves the dynamic personal attribute using the username. At step 326, the web server transmits an authentication webpage to the user device. The authentication webpage includes the dynamic personal attribute (and may or may not be adapted to accept a password from the user via a web browser of the user device).

As depicted in FIG. 3, for purposes of clarity assume that the authentication webpage (i.e., the authentication webpage provided at step 326) is adapted to accept a password from the user (rather than merely providing the dynamic personal attribute and requiring a separate set of transactions between the user device and web server in order to provide a webpage adapted to accept a password from the user).

At step 328, the user device receives the authentication webpage from the web server. At step 330, the user device displays the authentication webpage (including displaying the dynamic personal attribute, which the user may use in order to determine whether the website is valid) using the web browser.

At step 332, a determination is made as to whether the dynamic personal attribute displayed in the authentication webpage is valid. The determination as to whether the dynamic personal attribute is valid may be made by the user and/or the user device.

If the dynamic personal attribute is invalid, method 300 proceeds to step 350, at which point method 300 ends (i.e., the user deems the website to be an invalid website that is phishing for user information and, thus, the user does not continue the authentication process, i.e., the user does not enter the password).

If the dynamic personal attribute is valid, method 300 proceeds to step 334, at which point the user deems the website to be a valid website (i.e., the legitimate website that the user is attempting to access) and, thus the user does continue the authentication process (i.e., the user enters a password for the website).

At step 334, the user enters a password for the website in the authentication webpage. At step 336, the user device transmits the password (and, optionally, the username) for the website to the web server. For example, the user may enter the password in a PASSWORD field of the authentication page and trigger communication of the password to the web server (e.g., by pressing ENTER, clicking some button or link in the authentication webpage, and the like).

At step 338, the web server receives the password from the user device. At step 340, a determination is made as to whether the password is valid. The determination as to whether the password is valid may be performed in any manner for validating a password. In one embodiment, for example, the username provided by the user may be used to retrieve a valid password for the username (e.g., from an authentication database), and the password received from the user device may be compared against the valid password in order to determine whether the password received from the user device is valid.

If the password is invalid, method 300 proceeds to step 342, at which point the web server transmits an error webpage to the user device. The error webpage is adapted to inform the user that the user may not access the website (e.g., the password provided by the user is invalid) and, optionally, may invite the user to re-attempt the authentication process.

If the password is valid, method 300 proceeds to step 344, at which point the web server transmits a website webpage to the user device. The website webpage may be any webpage of the website (e.g., a default webpage provided upon successful authentication to the website, a webpage specifically requested by the user, and the like).

At step 346, the user device receives the webpage from the web server (i.e., either the error webpage or the website webpage). At step 348, the user device displays the received web page using the web browser. From step 348, method 300 proceeds to step 350, where method 300 ends. Although the authentication process ends, the user may continue to interact with the web server, or other web servers, as desired.

In an embodiment as depicted and described with respect to FIG. 3, the user is required to enter a username before the personal dynamic attribute is displayed to the user for validating the web server. While this embodiment is secure in most instances, situations may arise in which it may be disadvantageous for the user to enter a username before validating the web server using a dynamic personal attribute because a phishing attacker would then be able to obtain the username used by that user for the requested website. For example, in some instances a phishing attacker may be able to use an obtained username to retrieve the dynamic personal attribute from the legitimate website (e.g., either manually or automatically). This is basically a man-in-the-middle attack. While the dynamic personal attribute will become outdated automatically due to the dynamic nature of the dynamic personal attribute, it may still be desirable to prevent a phishing attacker from obtaining the dynamic personal attribute (e.g., to prevent the phishing attacker from knowing the type of information used as the dynamic personal attribute).

Due to the possibility of such a man-in-the-middle attack, another embodiment of the present invention may prevent the user from supplying a username before the dynamic personal attribute is displayed to the user for validating the web server. This embodiment requires the use of an additional identifier (i.e., other than the username and password, and, optionally, other sensitive information) which may be used to provide the dynamic personal attribute to the user before the user even enters a username. While this additional identifier used to retrieve the dynamic personal attribute may be another value that is manually entered by the user, such an implementation would still be vulnerable to a man-in-the-middle attach. Thus, in one embodiment, the additional identifier used to provide the dynamic personal attribute to the user may be a value that is automatically provided by the user device being used by the user. A method according to one such embodiment of the present invention is depicted and described with respect to FIG. 4.

FIG. 4 depicts a method according to one embodiment of the present invention. Specifically, method 400 of FIG. 4 includes a method for using a dynamic personal attribute associated with a user for preventing a phishing attack against that user. The method 400 of FIG. 4 is primarily described from the perspective of the interactions between the user device and the web server in order to describe the functions of the web server in providing the dynamic personal attribute which enables the user to identify the website as a valid website. Although depicted and described as being performed serially, at least a portion of the steps of method 400 of FIG. 4 may be performed contemporaneously, or in a different order than depicted and described with respect to FIG. 4. The method 400 begins at step 402 and proceeds to step 404.

At step 404, a user requests a website using a user device. The user may request the web page by typing the domain name of the website in an address bar of a web browser. The user may request the web page by clicking a hyperlink (e.g., from another website, from an e-mail, and the like). The user may request the web page in any other manner for requesting a web page.

At step 406, the user device transmits a website request message to a web server (i.e., the web server hosting the website requested by the user). The website request message includes an identifier adapted for retrieving a dynamic personal attribute for the user and providing the dynamic personal attribute to the user for use in validating the web server before entering any sensitive information (e.g., before entering a username and password).

In one embodiment, the identifier included within the website request message may be an identifier that is automatically provided by the user device. The identifier may be a value associated with the user device. For example, the identifier may be a MAC address of the user device, a cookie stored on the user device, an identifier computed based one on or more such values available from the user device, and the like, as well as various combinations thereof.

At step 408, the web server receives the website request message including the identifier from the user device. At step 410, the web server retrieves a login webpage of the requested website. At step 412, the web server retrieves a dynamic personal attribute for the user. The web server retrieves the dynamic personal attribute using the identifier included in the website request message. At step 414, the web server transmits the login webpage, including the dynamic personal attribute, to the user device. The login webpage is adapted to accept username and password values from the user via a web browser of the user device.

At step 416, the user device receives the login webpage, including the dynamic personal attribute, from the web server. At step 418, the user device displays the login webpage, including the dynamic personal attribute, using the web browser. The user may then use the dynamic personal attribute to determine the validity of the web server from which the login webpage is received before the user enters a username and password (or any other sensitive information).

At step 420, a determination is made as to whether the dynamic personal attribute displayed in the login webpage is valid. The determination as to whether the dynamic personal attribute is valid may be made by the user and/or the user device.

If the dynamic personal attribute is invalid, method 400 proceeds to step 438, at which point method 400 ends (i.e., the user deems the website to be an invalid website that is phishing for user information and, thus, the user does not continue the authentication process, i.e., the user does not enter authentication credentials for the website).

If the dynamic personal attribute is valid, method 400 proceeds to step 422, at which point the user deems the website to be a valid website (i.e., the legitimate website that the user is attempting to access) and, thus the user does continue the authentication process (i.e., the user enters authentication credentials for the website).

At step 424, the user enters authentication credentials for the website in the login webpage. At step 426, the user device transmits the authentication credentials for the website to the web server. The authentication credentials may include any information which may be used to authenticate the user with the web server. For example, the authentication credentials may include a username and password, a device identifier and pin number, or any other information which may be used for authentication.

For example, the user may enter a username value in a USERNAME field of the login page, enter a password value in a PASSWORD field of the login page, and trigger communication of the username value and the password value to the web server (e.g., by pressing ENTER, clicking some button or link in the login webpage, or performing some other similar action which triggers the transaction).

At step 426, the web server receives the authentication credentials from the user device. At step 428, a determination is made as to whether the authentication credentials are valid. The determination as to whether the authentication credentials are valid may be performed in any manner for authenticating a user.

In one embodiment, for example, where the authentication credentials include a username and password, the username provided by the user may be used to retrieve a valid password associated with the username (e.g., from an authentication database), and the password received from the user device may be compared against the valid password in order to determine whether the password received from the user device is valid.

If the authentication credentials are invalid, method 400 proceeds to step 430, at which point the web server transmits an error webpage to the user device. The error webpage is adapted to inform the user that the user may not access the website (e.g., the authentication credentials provided by the user are invalid) and, optionally, may invite the user to re-attempt the authentication process.

If the authentication credentials are valid, method 400 proceeds to step 432, at which point the web server transmits a website webpage to the user device. The website webpage may be any webpage of the website (e.g., a default webpage provided upon successful authentication to the website, a webpage specifically requested by the user, and the like).

At step 434, the user device receives the webpage from the web server (i.e., either the error webpage or the website webpage). At step 436, the user device displays the received web page using the web browser. From step 436, method 400 proceeds to step 438, where method 400 ends. Although the authentication process ends, the user may continue to interact with the web server, or other web servers, as desired.

As described herein, in addition to passively launching a phishing attack by tricking a user into requesting a webpage from a malicious web server, a malicious web server may launch an active phishing attack by emailing a user inviting the user to login to a website. The email is typically formatted to give the appearance of being from a valid website, and, further, typically includes a hyperlink having the appearance of being a hyperlink for a valid website, but which is in fact a hyperlink to the malicious website (e.g., providing a hyperlink to www.alactel-lucent.com/login instead of www.alcatel-lucent.com/login). Unfortunately, an unsuspecting or inattentive user may click the hyperlink to the malicious website without realizing that the hyperlink will redirect the user to the malicious website instead of the valid website being spoofed by that malicious website.

Thus, as described herein, in addition to providing a dynamic personal attribute to a user for a website during login to the website, a dynamic personal attribute may be provided to a user for a website before the user attempts to login to the website. The dynamic personal attribute may be provided to a user for a website before the user attempts to login to the website. The dynamic personal attribute may be provided to a user for a website before the user attempts to login to the website using any messaging or signaling (e.g., email, SMS text message, instant message, and the like) adapted for providing the dynamic personal attribute.

In one embodiment, for example, since websites often initiate emails to registered users inviting the registered users to access the respective websites, a dynamic personal attribute for a website may be provided to a user in an email message from the website. In this embodiment, the email to a user may invite the user to access the website for one or more reasons. For example, a website may initiate an email to a registered user for a variety of reasons, e.g., to inform a user that a new bill is available, to inform the user that a bill is past due, to inform the user of new products or services in which the user may be interested, to invite the user to verify that personal information is up-to-date, and the like, as well as various other combinations thereof.

In this embodiment, in addition to providing the dynamic personal attribute of the user in the email message, the email message may include one or more hyperlinks to webpages of the website, or may simply invite the user to access the website. In either case, by including a dynamic personal attribute in the email to the user, the website enables the user to confirm the validity of the email before accessing the website (e.g., before clicking the hyperlink(s) in the email or typing the URL in the address bar of the web browser). A method according to one such embodiment, from the perspective of the user, is depicted and described herein with respect to FIG. 5. A method according to one such embodiment, from the perspective of the web server, is depicted and described herein with respect to FIG. 6.

Figure 5:
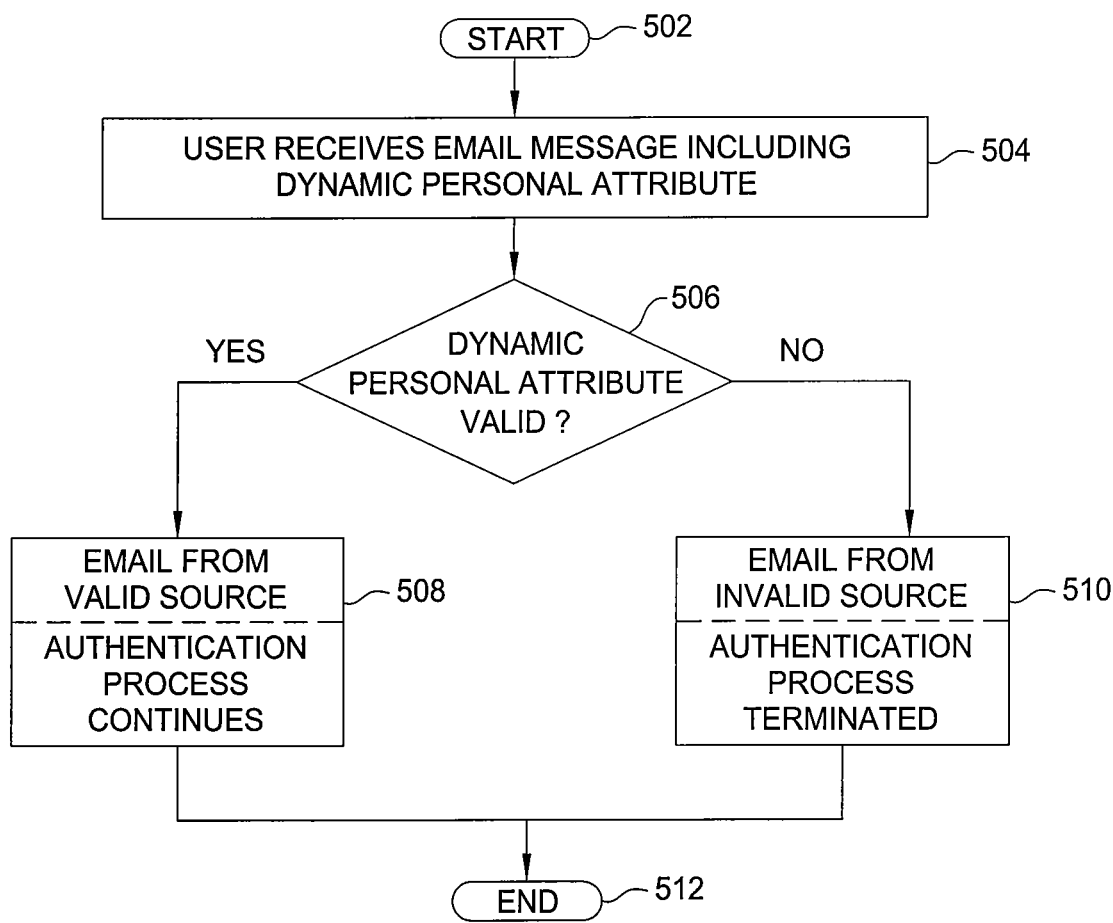
FIG. 5 depicts a method according to one embodiment of the present invention.

FIG. 5 depicts a method according to one embodiment of the present invention. Specifically, method 500 of FIG. 5 includes a method for using a dynamic personal attribute associated with a user for preventing a phishing attack against that user, where the dynamic personal attribute is provided to the user in an email message. The method 500 of FIG. 5 is primarily described from the perspective of the user because the user does not know whether the website is a valid website or an invalid website. Although depicted and described as being performed serially, at least a portion of the steps of method 500 of FIG. 5 may be performed contemporaneously, or in a different order than depicted and described with respect to FIG. 5. The method 500 begins at step 502 and proceeds to step 504.

At step 504, a user receives an email message. The email message is associated with a website. The email message invites the user to login to the website. The email message includes a dynamic personal attribute. The email message may include a hyperlink to a login webpage of the website or a hyperlink to a home webpage of the website, or may just include an invitation for the user to access the website.

At step 506, a determination is made as to whether the dynamic personal attribute included in the email is valid. The determination as to whether the dynamic personal attribute is valid may be made by the user and/or the user device.

If the dynamic personal attribute is valid, method 500 proceeds to step 508, at which point the user deems the email to be from a valid source (i.e., from valid website from which the email appeared to originate) and, thus the user does continue the authentication process (e.g., the clicks the hyperlink included in the email).

If the dynamic personal attribute is invalid, method 500 proceeds to step 510, at which point the user deems the email message to be from an invalid source (e.g., from a spoofed version of the real website that is phishing for user information) and, thus, the user does not continue the authentication process (e.g., the user does not click the hyperlink included in the email message).

From steps 508 and 510, method 500 proceeds to step 512. At step 512, method 500 ends; however, although authentication of the email using the dynamic personal attribute ends, the user will most likely still be required to proceed through the website authentication process in order to access the website from which the email originated.

The authentication process may proceed in any manner by which a website may authenticate a user before allowing the user to access the website. For example, after the user clicks the hyperlink included in the email, the login webpage (i.e., only allowing the user to enter a username) or the authentication webpage (i.e., allowing the user to enter both a username and a password) may be displayed to the user.

In embodiments in which the login webpage is displayed, the website may provide additional authentication capabilities. For example, the website may display additional authentication information to the user for verification by the user before the user enters a username in the login webpage. For example, the website may request additional authentication information from the user before providing the authentication webpage.

In embodiments in which the authentication webpage is displayed, the website may provide additional authentication capabilities. For example, the authentication webpage may simply include a USERNAME field and a PASSWORD field by which the user may enter a username and password in order to be authenticated to access the website. For example, the authentication webpage may include a USERNAME field, a PASSWORD field, and authentication information that is displayed to the user for verification by the user before the user enters a username and password in the authentication webpage.

Although omitted for purposes of clarity, those skilled in the art will appreciate that the functions of method 500 of FIG. 5 are enabled by a series of interactions between the user device used by the user to access the website and the web server hosting the website accessed by the user. A method for using a dynamic personal attribute associated with a user for preventing a phishing attack against that user (including messaging between the user device and the web server) is depicted and described with respect to FIG. 6.

FIG. 6 depicts a method according to one embodiment of the present invention. Specifically, method 600 of FIG. 6 includes a method for using a dynamic personal attribute associated with a user for preventing a phishing attack against that user, where the dynamic personal attribute is provided to the user in an email message. The method 600 of FIG. 6 is primarily described from the perspective of the web server in order to describe the functions of the web server in providing the dynamic personal attribute which enables the user to identify the website as a valid website. Although depicted and described as being performed serially, at least a portion of the steps of method 600 of FIG. 6 may be performed contemporaneously, or in a different order than depicted and described with respect to FIG. 6. The method 600 begins at step 602 and proceeds to step 604.

At step 604, the web server generates an email message intended for the user. The email message invites the user to login to the website. The email message includes a dynamic personal attribute. The email message may include a hyperlink to a login webpage of the website or a hyperlink to a home webpage of the website, or may just include an invitation for the user to access the website.

At step 606, the web server transmits the email message to the user device. At step 608, the user device receives the email message. At step 610, the user device displays the email message, including displaying the dynamic personal attribute (e.g., when the user accesses an email program, when a user accesses online email, and the like).

At step 612, a determination is made as to whether the dynamic personal attribute included in the email is valid. The determination as to whether the dynamic personal attribute is valid may be made by the user and/or the user device.

If the dynamic personal attribute is invalid, method 600 proceeds to step 644, at which point the user deems the email message to be from an invalid source (e.g., from a spoofed version of the real website that is phishing for user information) and, thus, the user does not continue the authentication process (e.g., the user does not click the hyperlink included in the email message). In other words, the login process continues.

If the dynamic personal attribute is valid, method 600 proceeds to step 614, at which point the user deems the email to be from a valid source (i.e., from valid website from which the email appeared to originate) and, thus the user does continue the authentication process (e.g., the clicks the hyperlink included in the email). In other words, the login process is terminated.

At step 614, the user requests the website identified in the email message. The user may request the website identified in the email message in any manner (e.g., by typing the web address of the website in an address bar of a web browser, by clicking a hyperlink included in the email message, and the like).

At step 616, the user device transmits a website request message to the web server (i.e., the web server hosting the website associated with the received email message). At step 618, the web server receives the website request message from the user device. At step 620, the web server retrieves a login webpage of the requested website. At step 622, the web server transmits the login webpage to the user device. The login webpage is adapted to accept USERNAME and PASSWORD values from the user via a web browser of the user device.

At step 624, the user device receives the login webpage. At step 626, the user device displays the login page. At step 628, the user enters authentication credentials into the login page. The authentication credentials may include any information adapted for use in authenticating the user with the web server (e.g., such as a username and associated password). At step 630, the user device transmits the authentication credentials to the web server.

At step 632, the web server receives the authentication credentials from the user device. At step 634, a determination is made as to whether the authentication credentials are valid. The determination as to whether the authentication credentials are valid may be performed in any manner for validating authentication credentials.

In one embodiment, for example, the username provided by the user may be used to retrieve a valid password for the username (e.g., from an authentication database), and the password received from the user device may be compared against the valid password in order to determine whether the password received from the user device is valid.

If the authentication credentials are invalid, method 600 proceeds to step 636, at which point the web server transmits an error webpage to the user device. The error webpage is adapted to inform the user that the user may not access the website (e.g., at least a portion of the authentication credentials provided by the user is invalid) and, optionally, may invite the user to re-attempt the authentication process.

If the authentication credentials are valid, method 600 proceeds to step 638, at which point the web server transmits a website webpage to the user device. The website webpage may be any webpage of the website (e.g., a default webpage provided upon successful authentication to the website, a webpage specifically requested by the user, and the like).

At step 640, the user device receives the webpage from the web server (i.e., either the error webpage or the website webpage). At step 642, the user device displays the received web page using the web browser. From step 642, method 600 proceeds to step 644, where method 600 ends. Although the authentication process ends, the user may continue to interact with the web server, or other web servers, as desired.

Although omitted from the method flow diagrams for purposes of clarity, communications between the user device and the web server may use any protocol adapted for facilitating such communications (e.g., using Hypertext Transfer Protocol (HTTP), Secure HTTP (HTTPS), and the like, as well as various combinations thereof). For example, the user device and web server may exchange non-critical information using a standard communication protocol (e.g., HTTP) and exchange critical information (e.g., where the user device provides login credentials such as username and password to the web server, or the web server provides the dynamic personal attribute to the user device) using a secure communication protocol (e.g. HTTPS).

Although primarily depicted and described with respect to providing a dynamic personal attribute in an email message, a dynamic personal attribute may be provided to a user using any out-of-band messaging (e.g., in an email message, in a SMS text message, in an instant message, and the like). For example, a dynamic personal attribute may be provided to a user in a text message propagated to a mobile phone. For example, a dynamic personal attribute may be provided to a user in an instant message propagated in response to a determination that the user logs into the instant messaging application.

Although primarily depicted and described with respect to providing one dynamic personal attribute to a user, multiple dynamic personal attributes may be provided to a user. Furthermore, although primarily depicted and described only with respect to dynamic personal attributes, in one embodiment one or more additional non-dynamic attributes (which may include static personal attributes and/or static non-personal attributes) may be provided to a user along with the one or more dynamic personal attributes provided to the user.

Although primarily depicted and described herein with respect to embodiments in which the dynamic personal attribute is stored on the web server hosting the website requested by the user, and provided directly to the user from web server hosting the website requested by the user, the dynamic personal attribute may be stored on any networked device and may be provided to the user from any networked device in any manner.

In one embodiment, the dynamic personal attribute is stored on a networked device(s) other than the web server hosting the website with which the dynamic personal attribute is associated. For example, the dynamic personal attribute may be stored on a network element operated by the web content provider (i.e., the web content provider that operates the web server hosting the website with which the dynamic personal attribute is associated), one or more communication service providers, one or more third party providers, and the like, as well as various combinations thereof.

In some such embodiments, the networked devices may be devices that are dedicated to maintaining dynamic personal attributes (i.e., network devices not dedicated to performing other functions, but which may perform other functions). For example, web content providers, communications service providers, third-party providers, and the like, as well as various combinations thereof, may maintain servers and/or databases dedicated to maintaining dynamic personal attributes.

In some such embodiments, the networked devices may be devices that are dedicated to performing other functions, but which have information which may be used as the dynamic personal attribute. For example, the networked devices may include billing systems of communications service providers, location tracking devices of wireless service providers (e.g., devices capable of knowing the current location of a wireless device of a particular user), and the like, as well as various combinations thereof.

In one embodiment, the information used as the dynamic personal attribute may include information available from the website for which the dynamic personal attribute is maintained.

For example, the dynamic personal attribute for a website operated by the cellular phone company with which the user has cellular phone service may include information such as the last incoming/outgoing call that was received/placed by the user, the amount of the last payment made by the user, and the like, as well as various combinations thereof.

For example, the dynamic personal attribute for a website operated by the credit card company with which the user has a credit card account may include information such as the location of the last purchase made with the credit card, the amount of the last payment made by the user, and the like, as well as various combinations thereof.

In one embodiment, the information used as the dynamic personal attribute may include information that is not available from the web server hosting the website for which the dynamic personal attribute is maintained.

In one such embodiment, the web server hosting the website for which the dynamic personal attribute is required may retrieve some or all of the information from one or more other sources of dynamic personal attribute information and provide the information to the user as a dynamic personal attribute.

For example, the dynamic personal attribute for a website operated by an online shopping company with which the user has an account may include information such as the current location of the cell phone of the user where that information is available from the wireless service provider of the user and provided by the wireless service provider to the online shopping company, the last incoming/outgoing call that was received/placed by the user that is available from the wireless service provider where that information is provided by the wireless service provider to the online shopping company, and the like, as well as various combinations thereof.

In another such embodiment, the web server hosting the website for which the dynamic personal attribute is required may direct one or more other sources of the dynamic personal attribute information to provide the information directly to the user as a dynamic personal attribute.

For example, the dynamic personal attribute for a website operated by a bank with which the user has an account may include information such as the current location of the cell phone of the user where that information is available from the wireless service provider of the user and provided by the wireless service provider directly to the user, the last incoming/outgoing call that was received/placed by the user that is available from the wireless service provider where that information is provided by the wireless service provider directly to the user, and the like, as well as various combinations thereof.

Although primarily depicted and described herein with respect to specific implementations, the present invention is not intended to be limited by such exemplary implementations. As described herein, the source(s) of the dynamic personal attributes may be operated by any providers, e.g., by the web content provider, one or more communications service providers, one or more third party providers, and the like, as well as various combinations thereof. As further described herein, the dynamic personal attributes may be stored in any manner. In other words, the dynamic personal attribute may be retrieved from any source and provided from the source to the user in any manner.

Figure 7:
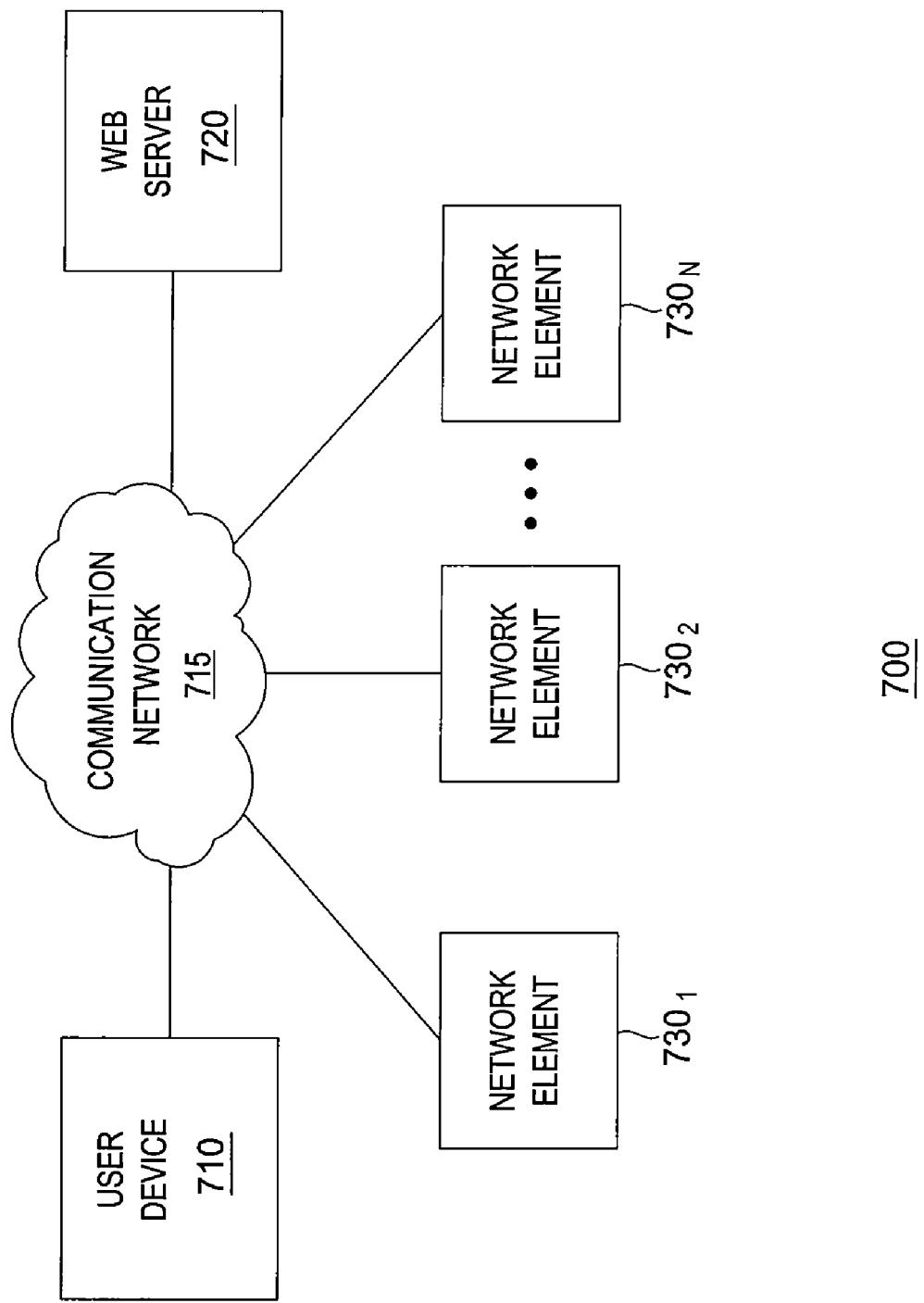
FIG. 7 depicts a high-level block diagram of a communication network according to one embodiment of the present invention.

FIG. 7 depicts a high-level block diagram of a communication network according to one embodiment of the present invention. Specifically, communication network 700 of FIG. 7 includes a user device 710 and a web server 720 in communication via a communication network 715. Additionally, communication network 700 includes a plurality of network elements $730_1$-$730_N$ (collectively, network elements 730).

The network elements 730 are any network elements which may store dynamic personal attributes or information which may be used as dynamic personal attributes. The network elements 730 may provide a dynamic personal attribute to web server 720 directly or indirectly (e.g., by providing the dynamic personal attribute to web server 720 which, in turn, propagates the dynamic personal attribute to user device 710).

For example, network elements 730 may include dedicated servers and/or databases (i.e., devices dedicated to storing dynamic personal attributes) or other network elements which may store information which may be used as dynamic personal attributes (e.g., devices operated by the web content provider, communications service providers, third-party providers of dynamic personal attributes, and the like, as well as various combinations thereof).

Furthermore, although primarily depicted and described herein with respect to a specific application of the present invention (namely, enabling a user using a network communication device to validate a web server hosting a website), those skilled in the art will understand that the present invention may be used in various other applications. Thus, more generally, the present invention may be used to enable a user using a terminal device to validate a remote server. This more general application of the present invention may be better understood with respect to the following exemplary applications of the dynamic personal attribute of the present invention.

In one embodiment, for example, the terminal device is an ATM terminal and the remote server is a bank server. In this example, by retrieving a dynamic personal attribute and displaying the dynamic personal attribute to the user via the ATM terminal (e.g., in response to the user inserting the card into the ATM machine), the user will be able to determine whether or not the ATM terminal is legitimate (e.g., that the ATM terminal is really connected to the bank and not to some malicious device). Similarly, in other related embodiments, the terminal device may be a point-of-sale terminal (or other similar terminal related to financial transactions) and the remote server is a financial institution server (e.g., server of a bank, a credit card company, and the like).

In another embodiment, for example, the terminal device is a user terminal (e.g., laptop, cell phone, and the like) and the remote server is a network access device (e.g., WiFi access node, cellular access node, and the like). In this example, by retrieving a dynamic personal attribute and displaying the dynamic personal attribute to the user via the user terminal, the user will be able to determine whether or not the network access device is legitimate (e.g., that the network access device is not a malicious device made available for unsuspecting users looking for WiFi service, cellular service, or some other network access).

Although specific embodiments and examples of the present invention have been provided, those skilled in the art will appreciate that the dynamic personal attribute of the present invention may be used in various other applications. For example, the dynamic personal attribute of the present invention may be used in applications such as domain authentication (e.g., for network domains such as WANs, LANs, and the like), door access controls (e.g., using magnetic cards, fingerprints retinal scans, and the like), and the like. In other words, a dynamic personal attribute may be used by a user to validate any remote device. A more general application of the present invention is depicted and described with respect to FIG. 8 and FIG. 9.

Figure 8:
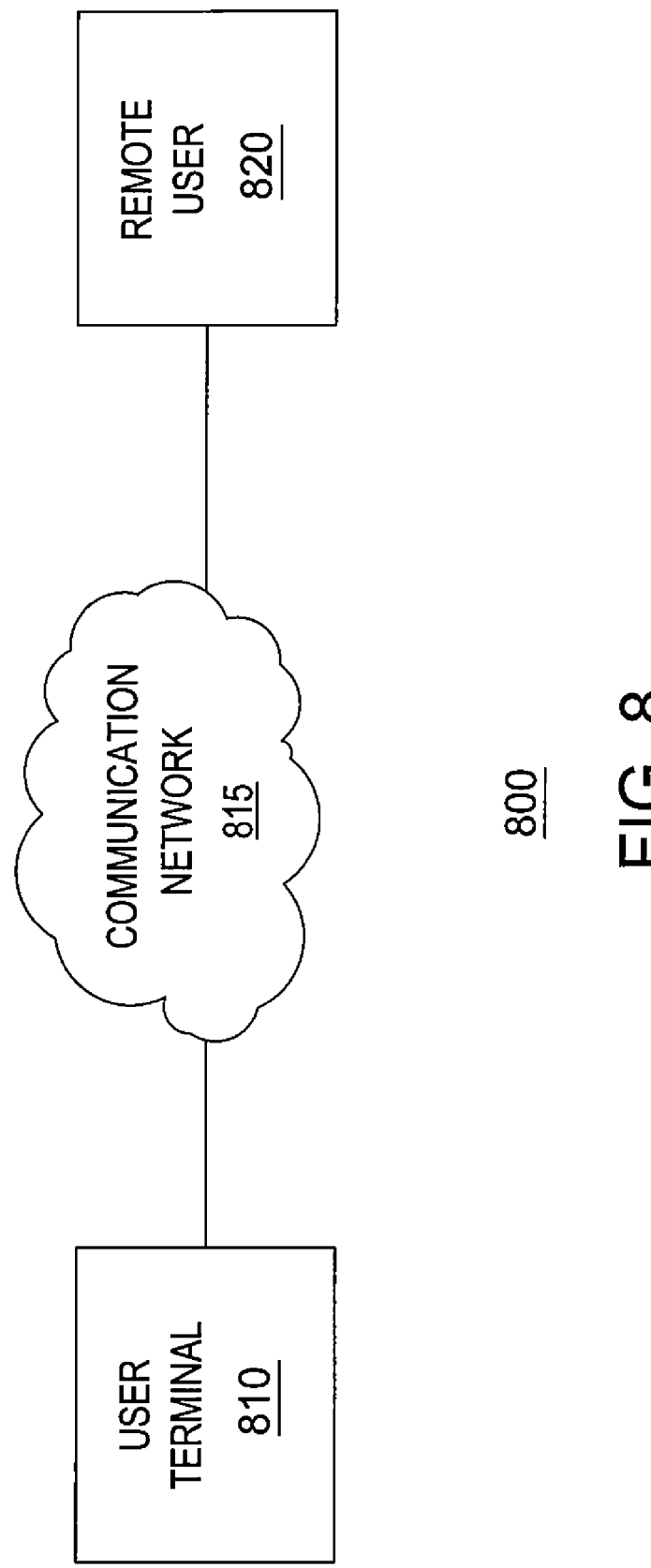
FIG. 8 depicts a high-level block diagram of a more general system within which the present invention may be applied.

FIG. 8 depicts a high-level block diagram of a more general system within which the present invention may be applied. Specifically, system 800 of FIG. 8 includes a user terminal 810 and a remote server 820. The user terminal 810 and remote server 820 communicate via a communication network 815 for exchanging information, including authentication parameters, such as user authentication parameters, dynamic personal attributes, and the like, as well as various combinations thereof. The communication network 815 may be any type of communication network adapted for facilitating communications between user terminal 810 and remote server 820 (e.g., a wireline network and/or a wireless network).

The user terminal 810 includes any device adapted for enabling a user to interact with remote server 820. For example, user terminal 810 may include a computer, a phone, a personal data assistant, an ATM machine, a user entry interface, and the like, as well as various combinations thereof. The user terminal 810 may include any means for enabling the user to interact with remote server 820, including entering and reviewing information. For example, user terminal 810 may include one or more display screens, keyboards, speakers, touch pads, magnetic card readers, retinal scanners, and the like, as well as various combinations thereof.

The remote server 820 includes any device which the user would like to validate before the user enters any sensitive information. For example, remote server 820 may include a web server, a financial institution server (e.g., a bank server serving an ATM machine, a bank server serving a point-of-sale terminal by which a user may pay using a debit card, a credit card company server serving a point-of-sale terminal by which a user may pay using a debit card, and the like), a network access point, and the like, as well as various combinations thereof. The remote server 820 may operate in any manner for enabling a dynamic personal attribute to be propagated to the user for use by the user in validating the remote server 820.

Figure 9:
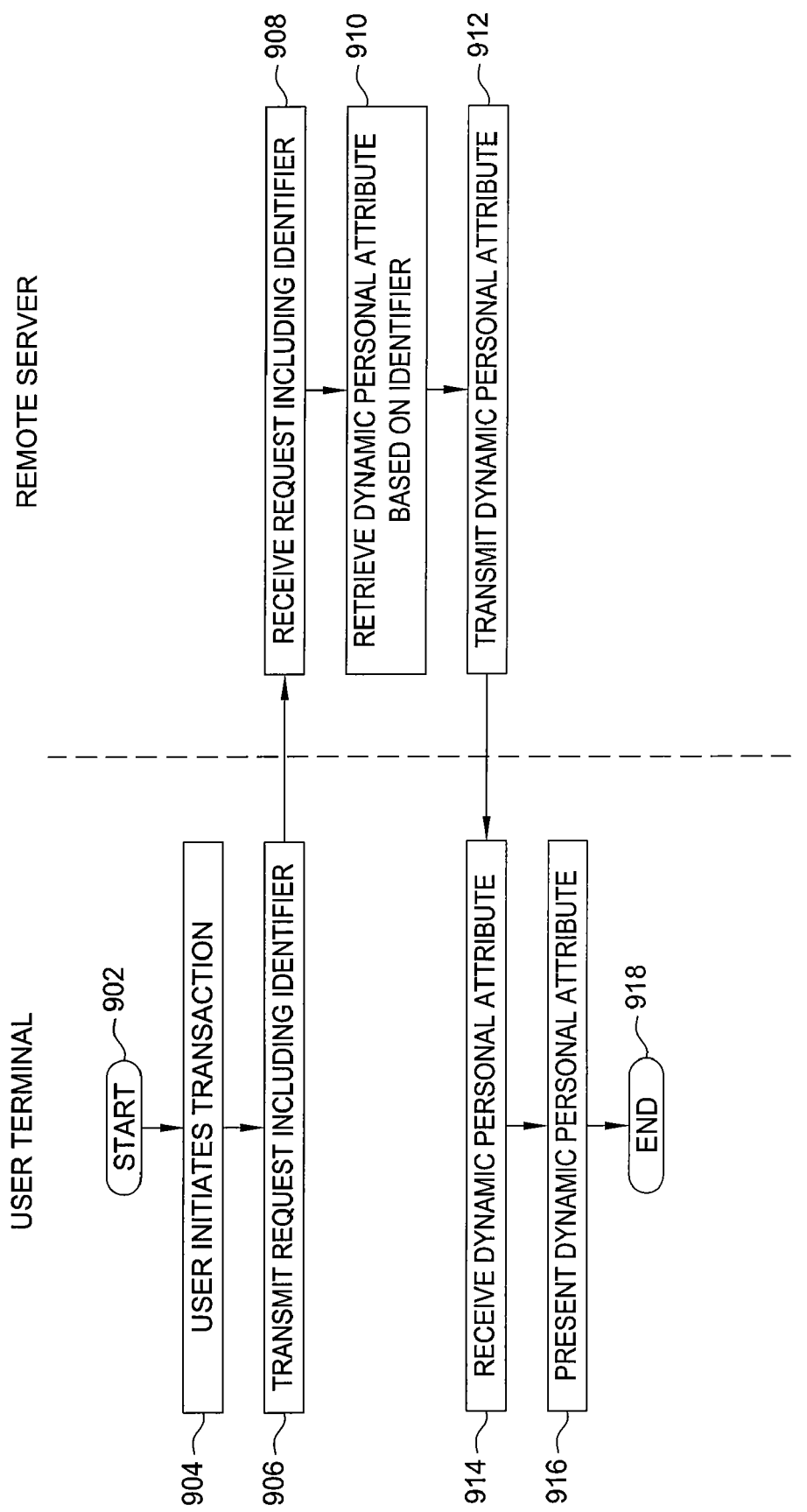
FIG. 9 depicts a method according to one embodiment of the present invention.

FIG. 9 depicts a method according to one embodiment of the present invention. Specifically, method 900 of FIG. 9 includes a method for using a dynamic personal attribute associated with a user for preventing a phishing attack against that user. The method 900 of FIG. 9 is primarily described from the more general perspective of the interactions between a user terminal and a remote server which, as described herein, may be utilized for enabling the user to validate the remote server in a various applications in which the present invention may be employed. Although depicted and described as being performed serially, at least a portion of the steps of method 900 of FIG. 9 may be performed contemporaneously, or in a different order than depicted and described with respect to FIG. 9. The method 900 begins at step 902 and proceeds to step 904.

At step 904, the user initiates a transaction. The user initiates the transaction via a user terminal. The transaction and the manner in which the transaction is initiated each vary depending on depending on the application of the present invention. For example, the transaction may be a request to authenticate with an ATM machine, a request to access a network via a network access point, and the like.

At step 906, the user terminal transmits a request including an identifier. The request is transmitted in response to the initiation of the transaction by the user. The request (e.g., type of request, format of request, and the like) and the identifier included within the request (e.g., whether the identifier is associated with the user and/or the user terminal) each vary depending on the application of the present invention.

For example, where the transaction is a request to authenticate with an ATM machine, the request may include the account number of the bank card that the user inserts into the ATM machine. For example, where the transaction is a request to access a network via a network access point, the identifier may include an identifier of the user device by which the user is attempting to access the network.

At step 908, the remote server receives the request including the identifier. At step 910, the remote server retrieves a dynamic personal attribute based on the identifier. At step 912, the remote server transmits the dynamic personal attribute to the user terminal. Although primarily depicted and described with respect to an embodiment in which the remote server transmits the dynamic personal attribute to the user terminal, the dynamic personal attribute may be propagated to the user terminal in other ways.

At step 914, the user terminal receives the dynamic personal attribute. At step 914, the user terminal presents the dynamic personal attribute to the user. The dynamic personal attribute may be presented to the user in various different ways, which may vary depending on the application of the present invention.

For example, where the transaction is a request to authenticate with an ATM machine, the dynamic personal attribute may be displayed to the user on the display screen of the ATM machine, thereby enabling the user to determine the validity of the remote server prior to entering authentication information for the ATM account (e.g., prior to entering a pin for that ATM card).

For example, where the transaction is a request to access a network via a network access point, the dynamic personal attribute may be displayed to the user on the display screen of the computer or other user device by which the user is attempting to access the access network, thereby enabling the user to determine the validity of the remote server prior to entering any authentication information.

At step 918, method 900 ends. Although depicted as ending, it should be noted that the process may or may not continue depending on whether the user has determined that the remote server is valid.

For example, where the transaction is a request to authenticate with an ATM machine, upon determining that the dynamic personal attribute is valid (and, thus, the remote server is valid), the user may enter a pin for that ATM card and, once authenticated by the ATM machine, may proceed to check an account balance, withdraw cash from the ATM machine, or perform other similar operations available from an ATM machine.

For example, where the transaction is a request to access a network via a network access point, upon determining that the dynamic personal attribute is valid (and, thus, the remote server is valid), the user may enter a login and password and, once authenticated by the remote server, may proceed to access the Internet or other resources available from the accessed network or perform other similar operations available from the network.

Figure 10:
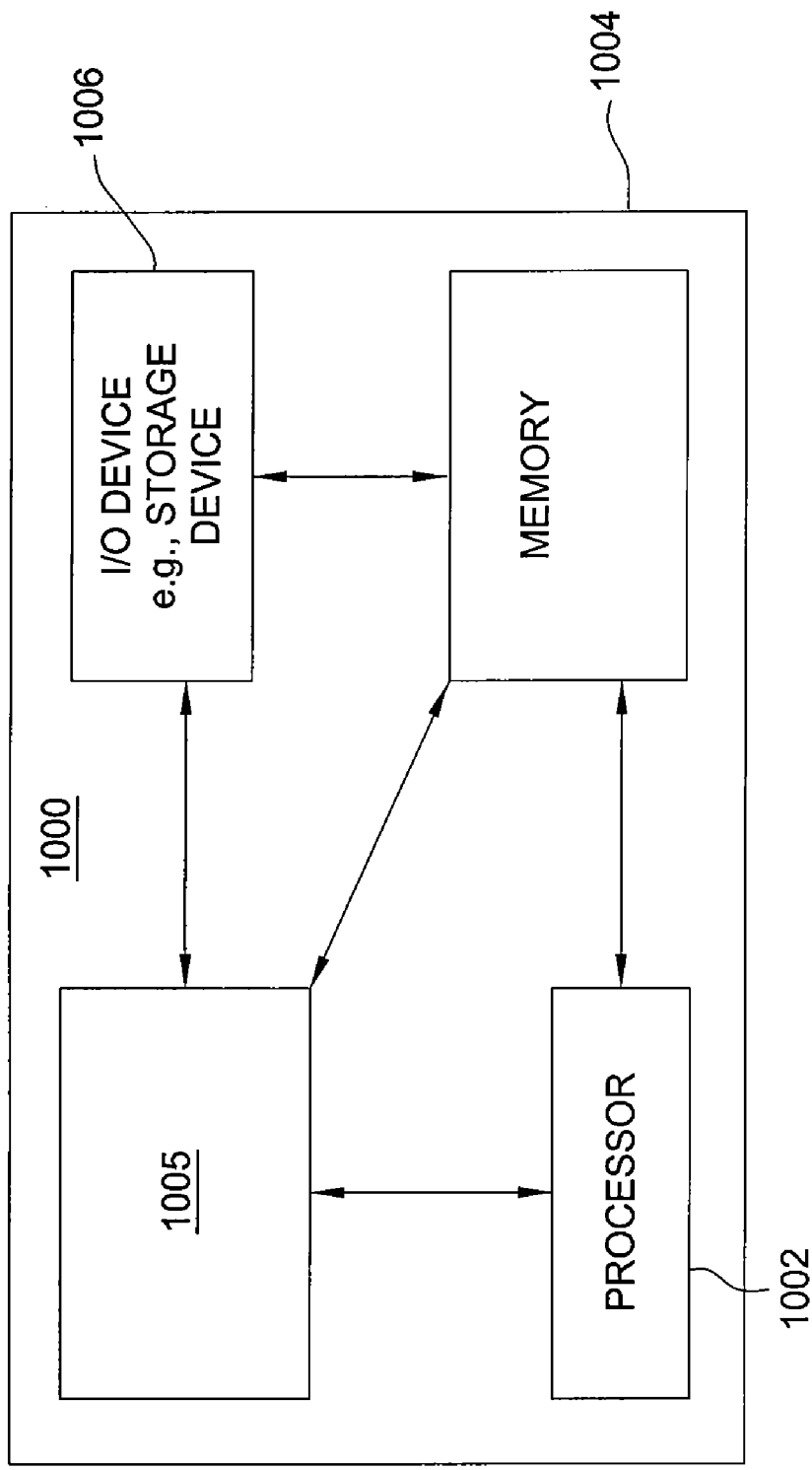
FIG. 10 depicts a high-level block diagram of a general-purpose computer suitable for use in performing the functions described herein.

FIG. 10 depicts a high-level block diagram of a general-purpose computer suitable for use in performing the functions described herein. As depicted in FIG. 10, system 1000 comprises a processor element 1002 (e.g., a CPU), a memory 1004, e.g., random access memory (RAM) and/or read only memory (ROM), an authentication security module 1005, and various input/output devices 1006 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present authentication security process 1005 can be loaded into memory 1004 and executed by processor 1002 to implement the functions as discussed above. As such, authentication security process 1005 (including associated data structures) of the present invention can be stored on a computer readable medium or carrier, e.g., RAM memory, magnetic or optical drive or diskette and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for informing a user that a remote server is valid, comprising:
   receiving a request of the user to access a website available from the remote server, the request comprising an identifier associated with a user terminal of the user;
   in response to the request, retrieving a dynamic personal attribute associated with the user for the website, wherein the dynamic personal attribute is retrieved using the identifier associated with the user terminal of the user, wherein retrieving the dynamic personal attribute comprises initiating a query toward a network element of a communications service provider, wherein the dynamic personal attribute is a current location of a mobile device of the user, wherein the network element of the communications service provider is a network element of a wireless service provider; and
   propagating the dynamic personal attribute toward the user for use by the user in validating the remote server, wherein the dynamic personal attribute is propagated toward the user as part of a webpage configured to accept a username of the user for the website and a password of the user for the website.

2. The method of claim 1, wherein the identifier associated with the user terminal of the user comprises at least one of a MAC address of the user terminal and at least one cookie stored on the user terminal.

3. The method of claim 1, wherein the dynamic personal attribute comprises a value adapted for being updated automatically.

4. The method of claim 1, wherein the dynamic personal attribute further comprises at least one of an amount of a bill paid by the user, an amount of a purchase made by the user with a credit card, a location of a purchase made by the user with a credit card, an amount of an ATM withdrawal made by the user with an ATM card, a location of an ATM withdrawal made by the user using an ATM card, information associated with an incoming call received by the user, information associated with an outgoing call placed by the user, a sender of a text message received by the user, a receiver of a text message sent by the user, a location of a wireless phone of the user during a call, and a status message in an instant message (IM) client associated with the user.

5. The method of claim 1, wherein the remote server comprises one of a web server, an authentication server, and a network access device.

6. The method of claim 1, wherein the identifier associated with the user terminal of the user comprises a value computed by the user terminal of the user using at least one of a MAC address of the user terminal and at least one cookie stored on the user terminal.

7. The method of claim 1, wherein the remote server is associated with an online merchant.

8. An apparatus for informing a user that a remote server is valid, the apparatus comprising:
   a processor configured to:
      receive a request of the user to access a website available from the remote server, the request comprising an identifier associated with a user terminal of the user;
      in response to the request, retrieve a dynamic personal attribute associated with the user for the website, wherein the dynamic personal attribute is retrieved using the identifier associated with the user terminal of the user, wherein retrieving the dynamic personal attribute comprises initiating a query toward a network element of a communications service provider, wherein the dynamic personal attribute is a current location of a mobile device of the user, wherein the network element of the communications service provider is a network element of a wireless service provider; and propagate the dynamic personal attribute toward the user for use by the user in validating the remote server, wherein the dynamic personal attribute is propagated toward the user as part of a webpage configured to accept a username of the user for the website and a password of the user for the website.

9. The apparatus of claim 8, wherein the identifier associated with the user terminal of the user comprises at least one of a MAC address of the user terminal and at least one cookie stored on the user terminal.

10. The apparatus of claim 8, wherein the dynamic personal attribute comprises a value adapted for being updated automatically.

11. The apparatus of claim 8, wherein the dynamic personal attribute further comprises at least one of an amount of a bill paid by the user, an amount of a purchase made by the user with a credit card, a location of a purchase made by the user with a credit card, an amount of an ATM withdrawal made by the user with an ATM card, a location of an ATM withdrawal made by the user using an ATM card, information associated with an incoming call received by the user, information associated with an outgoing call placed by the user, a sender of a text message received by the user, a receiver of a text message sent by the user, a location of a wireless phone of the user during a call, and a status message in an instant message (IM) client associated with the user.

12. The apparatus of claim 8, wherein the remote server comprises one of a web server, an authentication server, and a network access device.

13. The apparatus of claim 8, wherein the identifier associated with the user terminal of the user comprises a value computed by the user terminal of the user using at least one of a MAC address of the user terminal and at least one cookie stored on the user terminal.

14. The apparatus of claim 8, wherein the remote server is associated with an online merchant.

15. A non-transitory computer-readable storage medium storing instructions which, when executed by a computer, cause the computer to perform a method for informing a user that a remote server is valid, the method comprising:

receiving a request of the user to access a website available from the remote server, the request comprising an identifier associated with a user terminal of the user;

in response to the request, retrieving a dynamic personal attribute associated with the user for the website, wherein the dynamic personal attribute is retrieved using the identifier associated with the user terminal of the user, wherein retrieving the dynamic personal attribute comprises initiating a query toward a network element of a communications service provider, wherein the dynamic personal attribute is a current location of a mobile device of the user, wherein the network element of the communications service provider is a network element of a wireless service provider; and propagating the dynamic personal attribute toward the user for use by the user in validating the remote server, wherein the dynamic personal attribute is propagated toward the user as part of a webpage configured to accept a username of the user for the website and a password of the user for the website.

\* \* \* \* \*